United States Patent [19]

Harrelson, III et al.

[11] Patent Number: 6,023,826
[45] Date of Patent: Feb. 15, 2000

[54] VALVE PACKING COMPRESSION APPARATUS

[75] Inventors: Albert L. Harrelson, III, Marion; Boris W. Haritonoff, Geneseo; T. Scott Tanner, Rochester, all of N.Y.

[73] Assignee: Garlock Inc, Palmyra, N.Y.

[21] Appl. No.: 09/096,911

[22] Filed: Jun. 12, 1998

Related U.S. Application Data

[60] Provisional application No. 60/049,760, Jun. 16, 1997.

[51] Int. Cl.⁷ .................................................. B23P 19/04
[52] U.S. Cl. .............................. 29/213.1; 29/252; 29/267
[58] Field of Search .................... 269/32, 94; 29/402.02, 29/402.08, 235, 450, 451, 252, 213.1, 267, 890.124

[56] References Cited

U.S. PATENT DOCUMENTS

| | | | |
|---|---|---|---|
| 3,227,438 | 1/1966 | Sequin | 269/94 |
| 4,096,608 | 6/1978 | Lagerstedt | 269/32 |
| 4,673,173 | 6/1987 | Shochi et al. | 269/32 |
| 4,686,897 | 8/1987 | Frank. | |
| 4,721,293 | 1/1988 | Schron et al. | 269/94 |
| 5,452,885 | 9/1995 | Beere | 269/32 |

FOREIGN PATENT DOCUMENTS

| | | |
|---|---|---|
| 4123471C2 | 7/1991 | Germany. |
| 19623360C1 | 6/1996 | Germany. |

*Primary Examiner*—Robert C. Watson
*Attorney, Agent, or Firm*—Cummings & Lockwood

[57] ABSTRACT

A valve packing compression apparatus and method of use therefor are disclosed for compressing packing rings into a stuffing box of a valve bonnet which has a gland follower. The compression apparatus includes a base plate configured to support and consistently position the valve bonnet. A rocker arm is pivotally attached to the base plate. A hydraulic ram is also attached to the base plate and extends to contact one end of, and thereby pivot, the rocker arm. The opposite end of the rocker arm includes a pair of tines which straddle a yoke support arm of the valve bonnet and align with the gland follower. Hydraulic fluid is provided to the ram by a hydraulic pump through a pressure regulator. When the hydraulic ram is activated to extend, the tines contact the gland follower, thereby compressing the packing rings a predetermined amount.

30 Claims, 13 Drawing Sheets

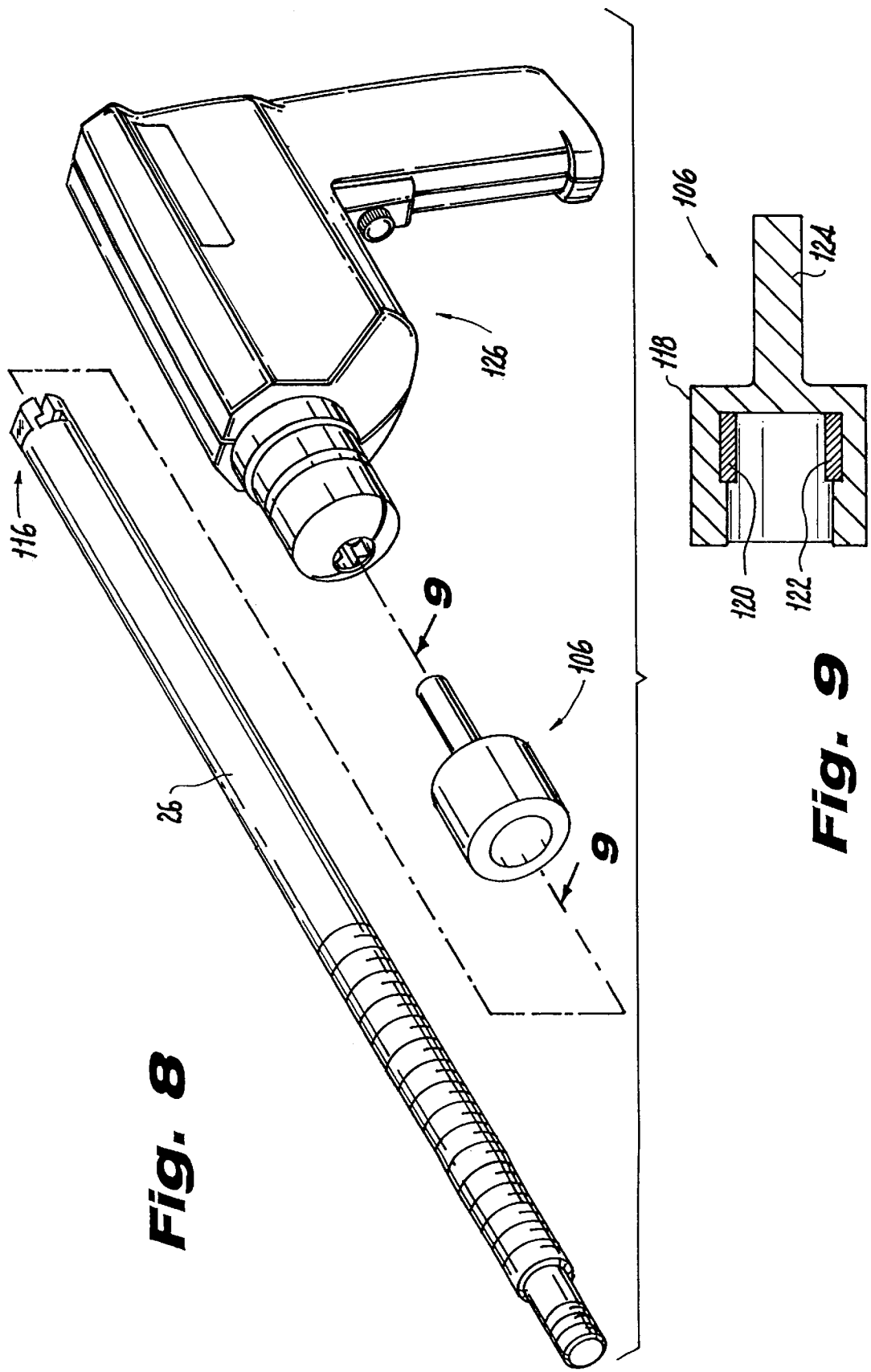

VALVE PACKING COMPRESSION APPARATUS

CROSS-REFERENCE TO RELATED APPLICATIONS

This application claims priority to provisional application Serial No. 60/049,760, filed Jun. 16, 1997, which is herein incorporated by reference.

BACKGROUND OF THE INVENTION

1. Field of the Invention

The subject invention relates generally to the assembly of gate valves and more particularly to an apparatus and method for compressing packing rings in a stuffing box of a valve bonnet to provide even distribution of pressure between the packing rings and valve stem and therefore a longer packing ring life.

2. Background of the Related Art

Mechanical valves are used to start, stop, and regulate the flow of media through a pipe line or vessel. Valves accomplish this feat by way of allowing for the positioning of a mechanical "obstruction" (e.g., gate, globe, plug, ball, wedge, disc, diaphragm, check, etc.) in the pathway of the media flowing through the valve. The position of this "obstruction" (hereafter referred to as a gate) is controlled by its attachment to one end of an adjustable shaft or valve stem. The other end of this valve stem penetrates through a portion of the valve's body, called the valve bonnet, to the outside environment. A set of packing rings establish a seal between the valve stem and the valve bonnet; thereby, preventing the media in the valve from escaping to the outside environment. These rings also permit the stem to be actuated through its reciprocating or rotary functional length so the gate may be moved between the open and closed positions.

The packing rings are seated within a stuffing box formed in the valve bonnet. The stuffing box includes an annular cavity that surrounds the valve stem at its penetration point into the valve bonnet. A gland follower having a flange supporting an annular collar encircles the valve shaft and encloses the opening to the stuffing box, capturing the packing rings therebetween. Fasteners are used to draw the gland follower toward the valve bonnet compressing the packing rings between the walls of the stuffing box bore and the valve stem. Periodically, the gland follower must be readjusted to compensate for wear seen by the packing rings during their life. Once the gland follower has been adjusted to the acceptable degree of gland follower penetration into the stuffing box cavity, the valve must be taken out of service so the original packing rings can be replaced.

A mechanical actuator such as a hand operated wheel or a remotely operated motor is affixed to the outside end of the valve stem. This device, by its mechanical control of the valve stem, controls the position of the gate and its degree of obstruction to media flow through the valve.

Packing rings can be installed into the stuffing box in a single step procedure by inserting and compressing them as a set; or in a multi-step procedure by inserting and compressing less than all of the rings from a set and then inserting and compressing the complement of the rings from the set. The decision on which procedure to use is heavily dependent upon a number of factors including the type of rings, the dimensions of the stuffing box, the acceptable degree of compressive loading uniformity throughout all of the rings, and whether the benefits of conducting the multi-step installation procedure is justified by the additional expense in carrying it out. For reasons described below, the benefit in conducting the multi-step procedure is that the packing ring life is extended substantially.

The single step installation procedure calls for the ring installation and compression steps to be accomplished in one sequence of events. The stuffing box is loaded with individual packing rings until it is filled, the gland follower is assembled to the valve bonnet, and the fasteners are tightened to exert a compressive loading force against the packing rings. This procedure is the least time consuming because each of the individual installation steps is done only once. However, it does have several major performance drawbacks. For example, because the packing rings fit tightly into the stuffing box bore they are somewhat difficult to insert and are often damaged or at least distorted during the insertion process. Also, as the packing rings are compressed by the gland follower, the upper most packing rings tend to radially expand against the stuffing box bore and the valve stem, more so than the lower packing rings do, thereby causing uneven sealing therebetween. Uneven sealing between the packing rings and the valve stem leads to premature seal failure since the media in the valve tends to work its way up into the packing ring set.

It is well understood by those skilled in the art that uneven compressive loading throughout the packing ring set is caused by frictional forces that are established between the upper rings, and the valve stem and stuffing box bore as the gland follower is drawn into the stuffing box to compress the packing rings. This occurs because the upper rings are compressed by the gland follower and begin to expand sooner than the lower rings. And, because they are compressed sooner, they start to grip the valve stem and stuffing box bore sooner, thereby reducing the amount of axial compressive loading forces that are transmitted to lower packing rings. It is estimated that the resulting differential compressive loading forces between individual packing rings in a stuffing box is as great as about 50%. Therefore, a packing ring that is adjacent to the gland follower will experience the full compressive loading force exerted by the gland follower. However, the second ring (in descending order) will experience only about 50% of the initial axial loading forces, the third ring only about 25%, the fourth ring only about 12.5%, etc.

In order to form a seal that has the maximum degree of sealing effectiveness over its service life span, all of the installed packing rings should be equally compressed. If this is accomplished, all rings contribute equally to sealing. While the single step installation procedure is the most time efficient method of installing packing rings, it guarantees that the packing set will have varying degrees of axial loading and radial sealing forces distributed among its rings.

The conventional multi-step installation procedure calls for the ring insertion and compression steps to be accomplished in several repetitive cycles. The stuffing box is loaded with less than a full set of packing rings, the gland follower is positioned and bolted into place, and the fasteners are tightened to exert a compressive loading force on the packing seals. After loading is applied, the gland follower is removed and the remaining rings from the packing ring set are added to the stuffing box. Thereafter, the gland follower is repositioned and rebolted in place, and the fasteners are again tightened to compress the complete set. Following this procedure it is often found that at least one additional ring needs to be added to the stuffing box because of the space created by the additional compression of the packing set.

Although it would be more ideal to insert and compress each packing ring individually to attain maximum sealing forces throughout the packing ring set, inserting and compressing the packing set in two steps certainly provides a closer approximation to the ideal state than does the single step installation procedure. The major drawback to the multi-step procedure versus the single step procedure is the added time it takes to carry it out. The additional time it takes to perform the multi-step installation procedure adds a substantial amount of cost to each valve bonnet. And as the number of valve bonnets being assembled increases, it takes proportionally more time to assemble each bonnet due to such factors as operator fatigue.

Original equipment manufacturer's (OEM's) of gate valves are under a considerable amount of competitive pressure to keep their manufacturing costs and unit selling prices as low as possible. Very little can be done to significantly reduce the raw material and manufacturing (e.g., casting, machining, etc.) related costs since these are necessary aspects of the base product. Much of the design, metallurgy, wall thickness, part sizes, etc. are controlled by industry standards such as those developed by the American Petroleum Institute. One of the few areas where a significant impact on cost reduction can be influenced relates to the assembly cost of each unit. OEM's are especially sensitive to this cost and place a heavy emphasis on reducing the labor cost per unit of production. As a result, the competitive market influences force OEMs to take a hard look at labor costs in deciding which assembly procedures to follow. Procedures must be chosen that provide an acceptable compromise between optimal installation procedures and maximum throughput.

Clearly there is a need in the art for apparatuses and methods that would enable an OEM to utilize the multi-step installation procedure when installing packing rings into a valve bonnet to improve both the quality of the seal between the stem and valve bonnet and to reduce the amount of time in which the procedure is accomplished. There is also clearly a need for new apparatuses and methods that can further improve the sealing relationship provided by the multi-step installation procedure and do so within the time constraints imposed by the market forces.

SUMMARY OF THE INVENTION

The subject invention is directed to a valve packing compression apparatus for compressing packing rings with a gland follower into a stuffing box of a valve bonnet of the type including a flange, the stuffing box and a yoke depending therefrom, and a valve stem extending through the valve bonnet. The valve packing compression apparatus includes a base plate configured to support the valve bonnet by its flange and having a clearance groove through which the valve stem passes. Guides rails are attached to the base plate and include beveled edges against which the valve bonnet rests enabling consistent positioning of the valve bonnet in relation to the valve packing apparatus. A hydraulic ram is also attached to the base plate and includes a piston that extends in relation to the hydraulic ram. Positioned between the guide rails and the hydraulic ram is a rocker arm bracket. A rocker arm is pivotally pinned at its mid-section to the rocker arm bracket and includes a rounded end which contacts the piston and a forked end which aligns for contact with the top of the gland follower when the hydraulic ram is extended.

A hydraulic pump is in fluid communication with the hydraulic ram. Fluid pressure to the ram is controlled by an adjustable pressure regulator. A pressure gauge provides visual feedback to an operator regarding the pump output. A doubling acting valve is provided between the pressure regulator and the hydraulic ram for controlling the flow of hydraulic fluid there between.

Also included is a packing sleeve having an inside diameter sufficient to receive packing rings that are dimensioned to fit within the stuffing box of the valve bonnet. The packing sleeve is operatively configured to align with the stuffing box enabling insertion of the packing rings therein. An insertion tool having an outside diameter approximately equal to the outside diameter of the packing rings is slideably receivable within the packing sleeve. And a push rod is configured to mate with the insertion tool so to drivingly slide the packing rings into the stuffing box.

Also disclosed are several methods which utilize the above apparatus in the insertion and compression of packing rings into the stuffing box of the valve bonnet. The methods are particularly advantageous in that they eliminate damaged seals caused by improper insertion. In addition, they substantially reduce the amount of time it presently takes an operator to insert and compress packing rings. The methods also enable more even compression throughout the set of packing rings and, therefore, ensures a fluid tight seal throughout the length of the stuffing box—extending the working life of the packing seals.

Further features of the valve packing compression apparatus and method for its use will become more apparent to those having ordinary skill in the art from the following detailed description of the invention taken in conjunction with the drawings.

BRIEF DESCRIPTION OF THE DRAWINGS

So that those of ordinary skill in the art to which the subject invention appertains will more readily understand how to make and use the valve packing compression apparatuses and methods described herein, preferred embodiments of the invention will be described in detail herein below with reference to the drawings wherein:

FIG. 8 is a perspective view of a valve stem, power drill, and a stem chuck made in accordance with a preferred embodiment of the present invention;

FIG. 9 is an elevational view taken along line 9—9 of FIG. 8 of the stem chuck used for inserting a valve stem into a valve bonnet;

DETAILED DESCRIPTION OF THE PREFERRED EMBODIMENTS

Figure 1:
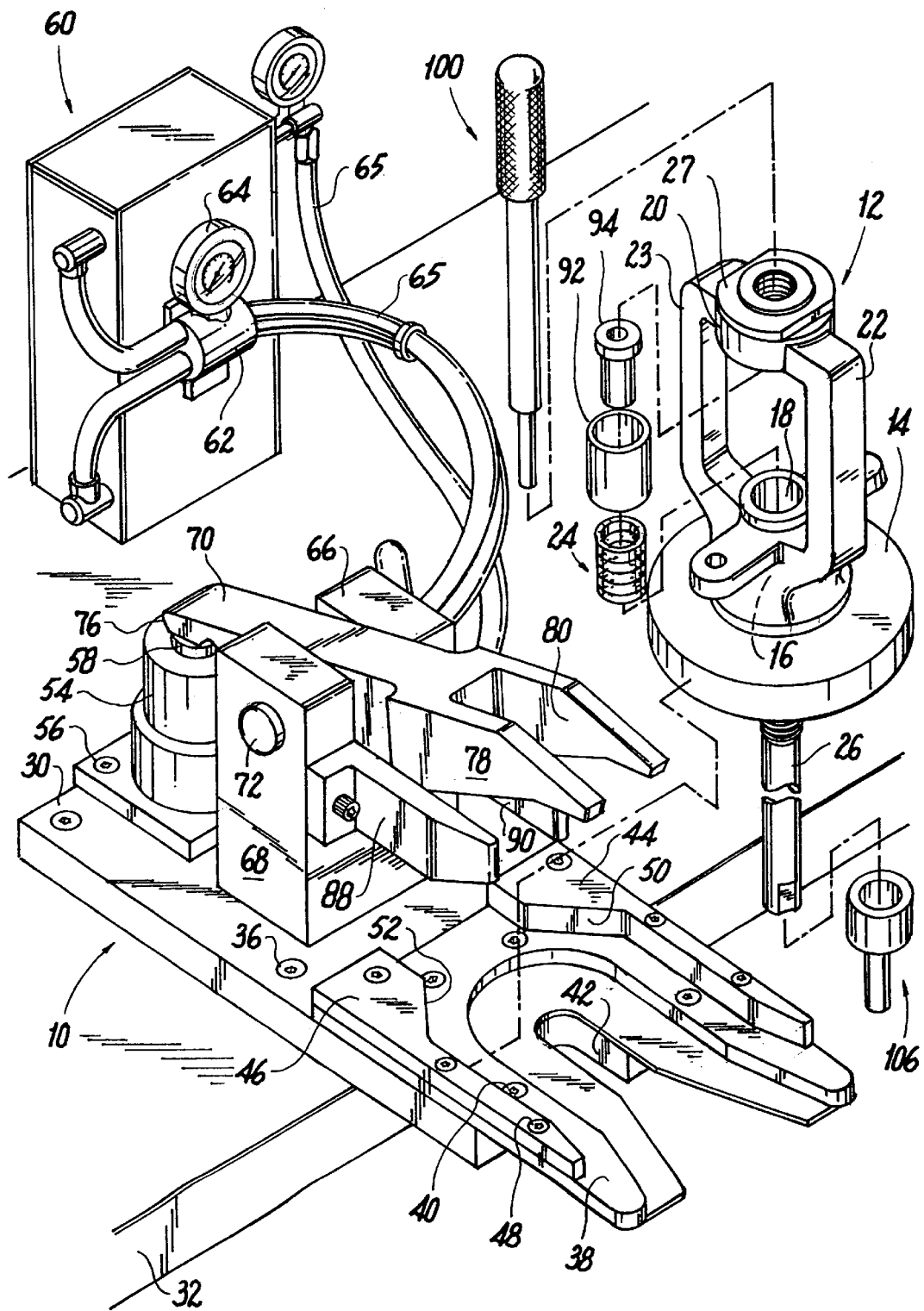
FIG. 1 is a perspective view of a valve packing compression apparatus made in accordance with a preferred embodiment of the subject invention.

Referring now to the drawings wherein like reference numerals identify similar structural elements of the subject invention, there is illustrated in FIG. 1 a perspective view of a valve packing compression apparatus and related components made in accordance with a preferred embodiment of the subject invention and designated generally at 10. Also illustrated is a valve bonnet, designated generally at 12, for a gate type valve (not shown). Valve bonnet 12 includes a flange 14 to which is attached a stuffing box 16 having a bore 18 therein and a yoke 26 attached by yoke supports 22 and 23. A yoke bushing 25 having a threaded inside diameter is inserted through yoke 20 and secured in place with lock nut 27. A set of packing rings 24 fit into stuffing box 16 for sealing between bore 18 and a valve stem 26. A gland follower 28 (refer to FIG. 11) encloses and compresses packing rings 24 in stuffing box 16. As will be described in detail below, compression apparatus 10 works upon valve bonnet 12 for compressing packing rings 24 into the stuffing box 16 to ensure a proper seal is achieved between the valve bonnet 12 and the valve stem 26.

Figure 12:
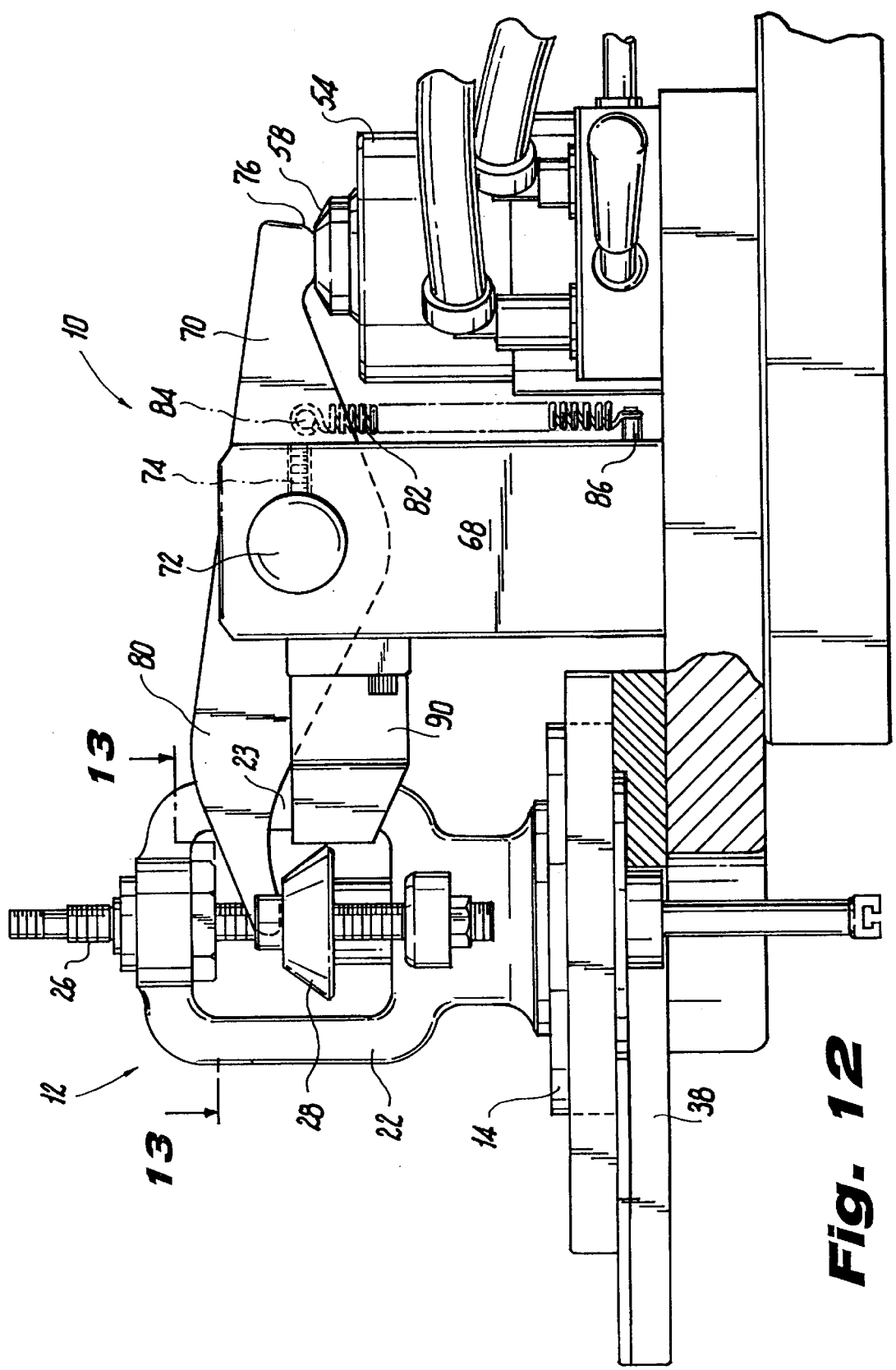
FIG. 12 is an elevational view of a valve bonnet positioned on a valve packing compression apparatus in partial cross-section and made in accordance with a preferred embodiment of the present invention.

With continued reference to FIG. 1 and also referring to FIG. 12, compression apparatus 10 includes a support plate 30 which is conventionally fastened to a work bench 32 with several conventional fasteners, 34 and 36. A base plate 38 configured to support valve bonnet 12 in an upright position is fastened to support plate 30 with several conventional fasteners 40. A clearance groove 42 is formed into base plate 38 and support plate 30 to provided a passage through which valve stem 26 can pass during placement or removal of valve bonnet 12 onto valve packing compression apparatus 10. A set of guide rails 44 and 46 are operatively connected to base plate 38 with conventional fasteners 48. Guide rails 44 and 46 include beveled surfaces 50 and 52, respectively, against which the outside diameter of flange 14 rests, when valve bonnet 12 is positioned on compression apparatus 10, to ensure consistent alignment therewith. Beveled surfaces 50 and 52 act as datum surfaces and can alternatively be provided by a more complex setup such as, for example, an adjustable mechanism for accommodating variously sized valve bonnets or simply by, for example, pressing two dowel pins into base plate 38.

A hydraulic ram 54 is operatively connected to support plate 30 with conventional fasteners 56. A piston 58 is extendible from hydraulic ram 54 between a fully compressed position and a fully extended position. A hydraulic pump 60 having an adjustable pressure regulator 62 and pressure gage 64 is in fluid communication with hydraulic ram 54 through a set of hydraulic lines 65 and an on/off valve 66. Pressure regulator 62 may be adjusted to provide a predetermined amount of fluid pressure to hydraulic ram 54.

A rocker arm bracket 68 is operatively connected to support plate 30 with conventional fasteners (not shown) installed from the far side of support plate 30. A rocker arm 70 is pivotally attached to rocker arm bracket 68 with a dowel pin 72. A set screw 74 secures dowel pin 72 in position. Rocker arm 70 includes a rounded portion 76 on one end which contacts the top of piston 58. Extending from the opposite end of rocker arm 70 is a set of tines 78 and 80 which straddle yoke support arm 23. Tines 78 and 80 operatively contact and apply force to the top of gland follower 28 when hydraulic ram 54 is in the extended position and do not contact gland follower 28 when piston 58 is retracted. An extension spring 82 is operatively connected to stud 84 on rocker arm 70 and operatively connected to stud 86 on rocker arm bracket 68 thereby maintaining the rounded portion 76 of rocker arm 70 in contact with piston 58 when tines 78 and 80 are not in contact with gland follower 28.

Figure 13:
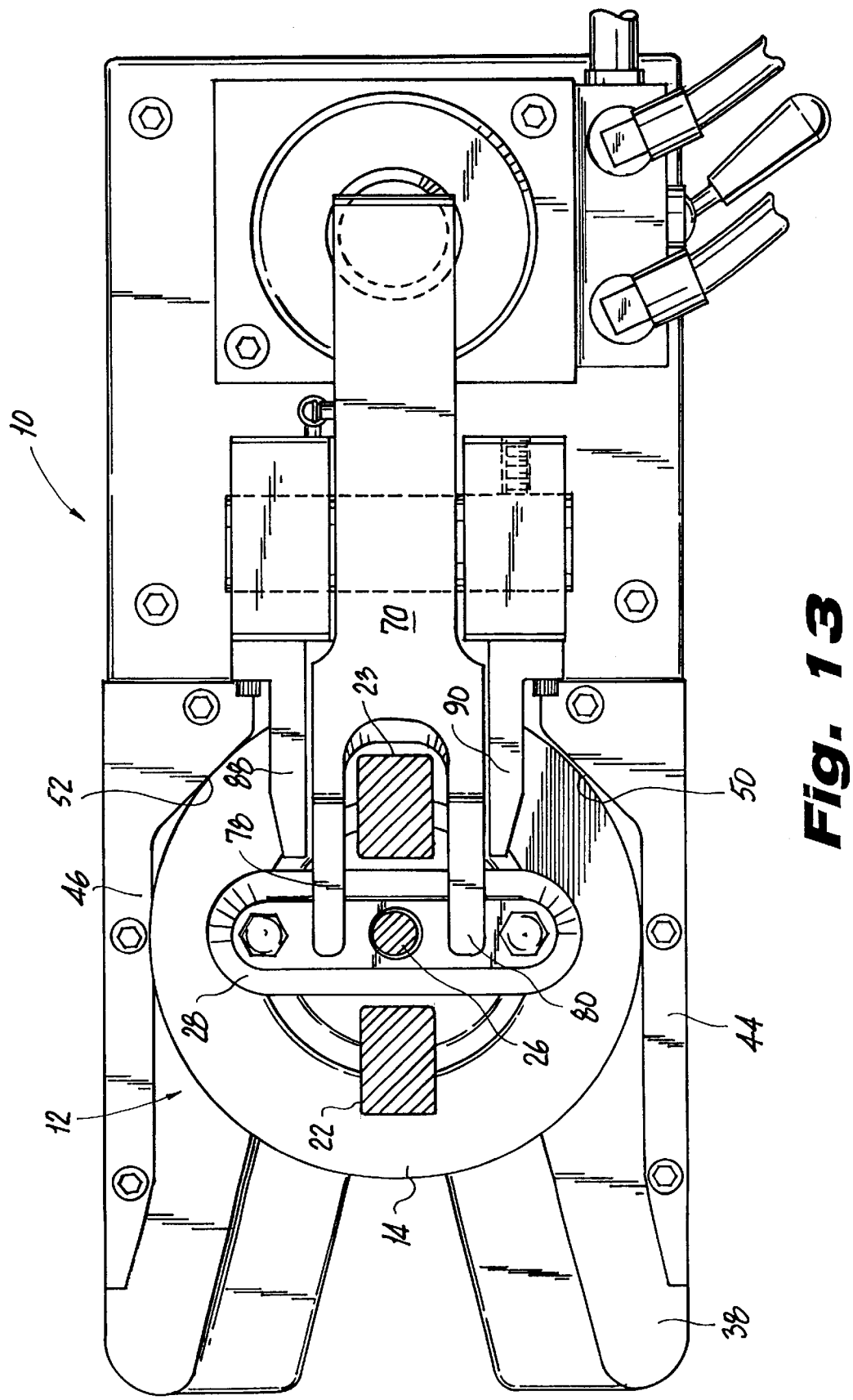
FIG. 13 is a plan view taken along line 13—13 of FIG. 12 of the valve bonnet positioned on the valve packing compression apparatus.

As noted above, guide rails 44 and 46 align valve bonnet 12 with valve packing compression apparatus 10 and therefor center gland follower 28 with tines 78 and 80. As best illustrated in FIG. 13, proper alignment between gland follower 28 and tines 78 and 80 assures that gland follower 28 will be driven straight down by rocker arm 70 into stuffing box 16 providing even and controlled compression of packing rings 24 (ref. FIG. 1). Stop bars 88 and 90 are fastened to rocker arm bracket 68 adjacent tines 78 and 80 preventing gland follower 28 from rotating when valve stem 26 is rotated during adjustment of the packing rings 24 by a method which will be described herein below.

Referring now to FIG. 1 and FIGS. 5–7, a packing sleeve 92 aligns with stuffing box bore 18 in preparation for insertion of packing rings 24. It should be noted that packing sleeve 92 can be loaded with packing rings 24 each time packing rings are to be inserted into a valve bonnet or, more conveniently, it can be supplied by a packing ring manufacturer pre-loaded with packing rings. The inside diameter of packing sleeve 92 is approximately equal to the inside diameter of stuffing box bore 18 and the outside diameter of packing sleeve 92 is less than the opening between tines 78 and 80 allowing positioning of packing sleeve 92 between tines 78 and 80 when valve bonnet 12 is installed in compression apparatus 10. With packing rings 24 inserted in packing sleeve 92, an insert tool 94 fits inside packing rings 24. Insert tool 94 includes a raised shoulder 96 having an outside diameter less than the inside diameter of packing sleeve 92 and a blind bore hole 98 extending from raised shoulder 96. A push rod 100 extends through yoke 20 and includes a stepped shoulder 104 that mates with the blind bore hole 98 of insert tool 94. Alternate embodiments of insert tool 94 and push rod 100 are envisioned as including, but not limited to, a push rod capable of mating with insert tool 94 from between yoke support arms 22 and 23 as opposed to through yoke 20, a simplified insert tool defined by an annular disk only, a single tool combining the attributes of both the push rod 100 and the insert tool 94, etc. A stem chuck 106 is operatively connected to valve stem 26 for engaging valve stem 26 with valve bonnet 12 in a manner that will be described herein below.

Figure 2:
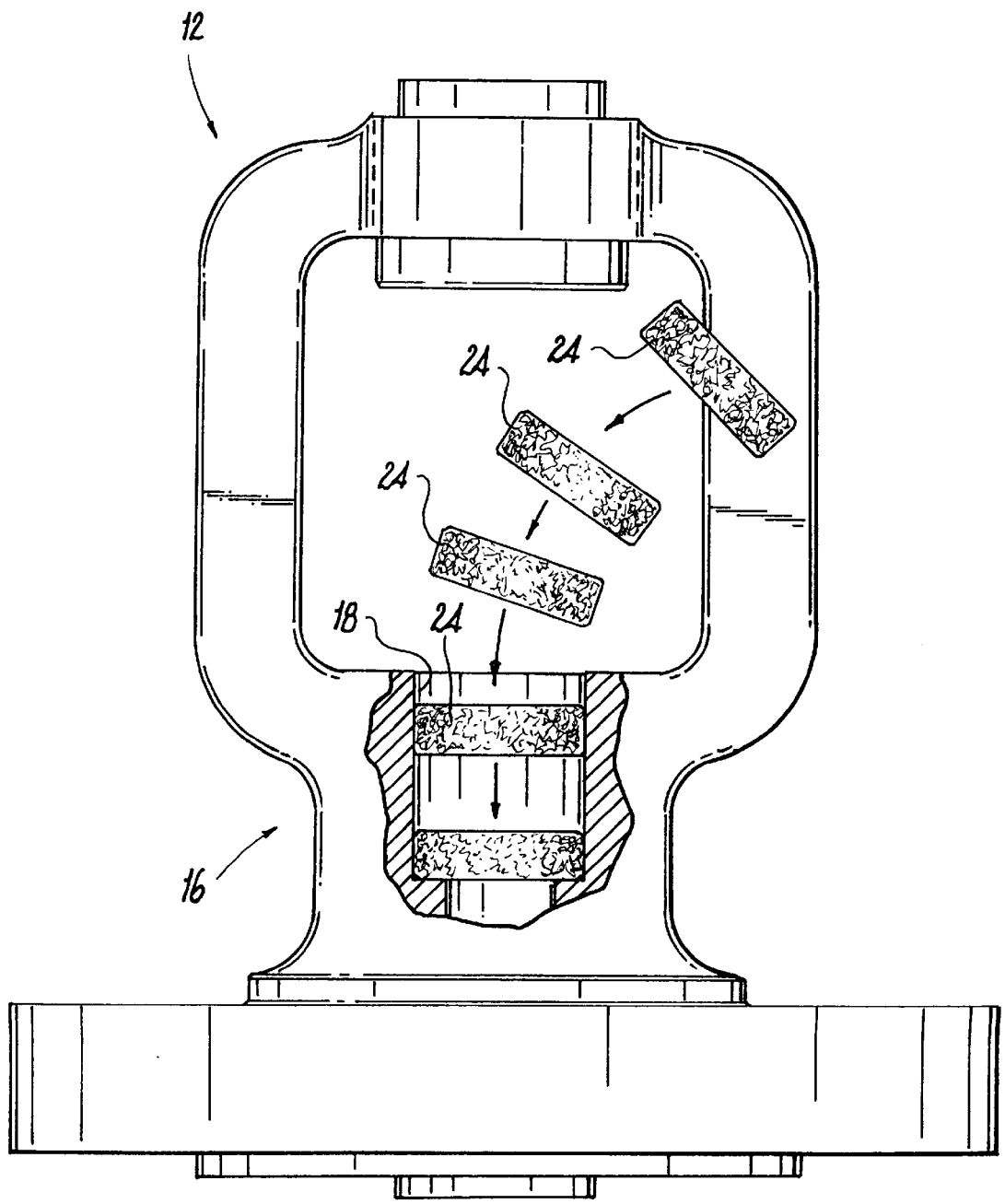
FIG. 2 is an elevation view in partial cross-section of a valve bonnet illustrating a prior art method of inserting packing rings into the stuffing box of the valve bonnet.
Figure 3:
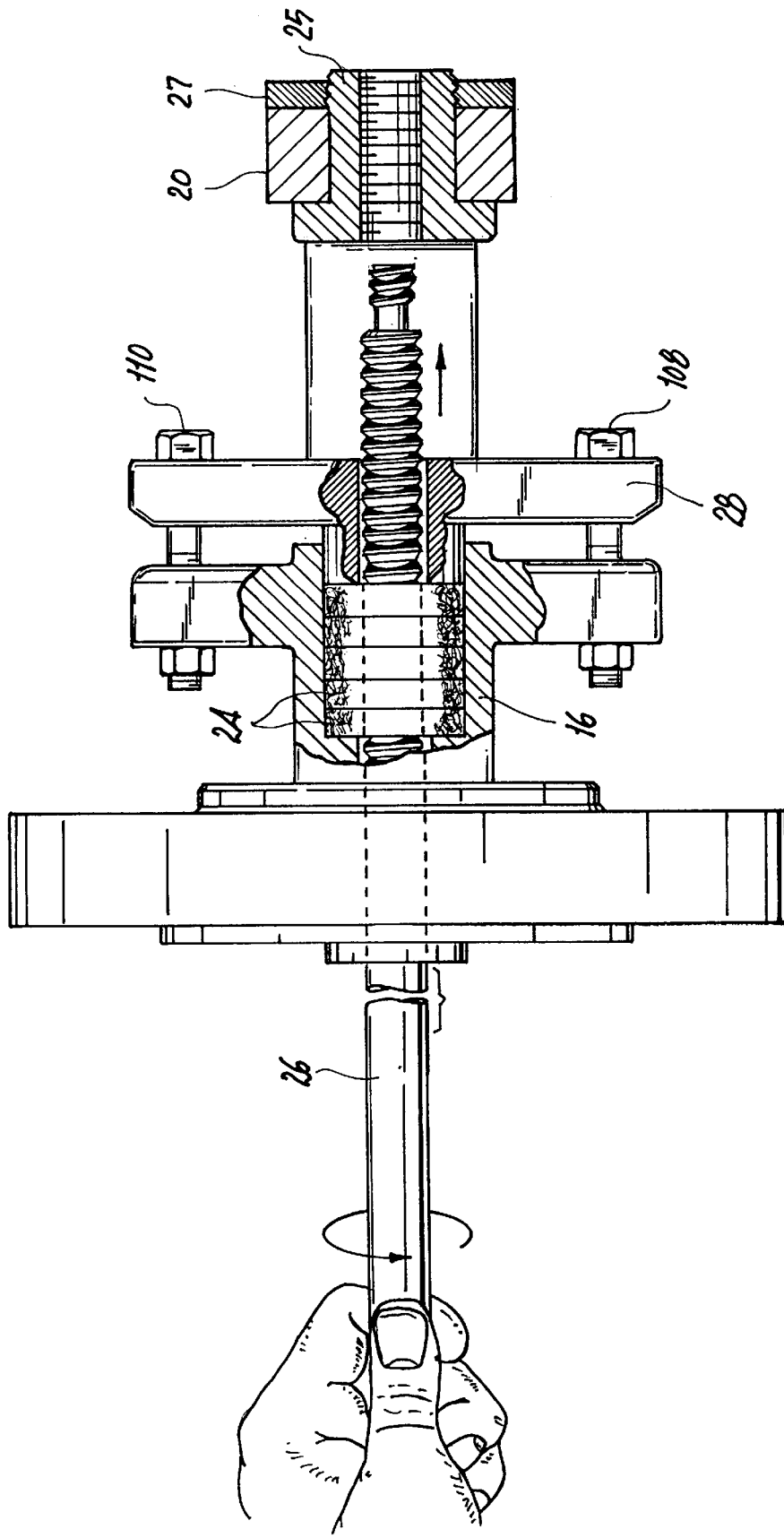
FIG. 3 is an elevational view similar to FIG. 2 of a valve bonnet in partial cross-section illustrating a prior art method of inserting a valve stem through the packing rings and yoke bushing of the valve bonnet.
Figure 4:
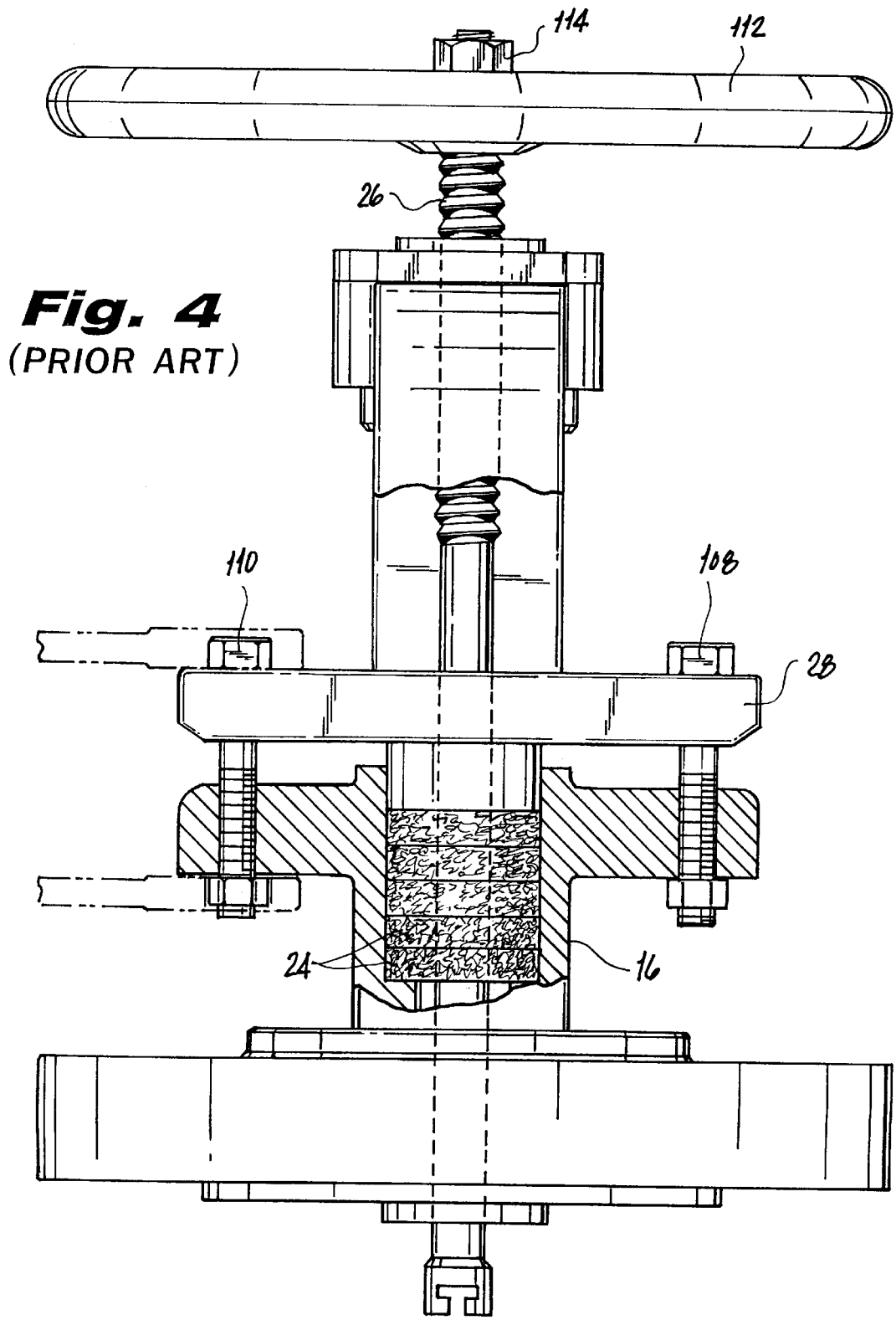
FIG. 4 is an elevational view of a valve bonnet in partial cross-section illustrating a prior art method of tightening fasteners against a gland follower to compress packing rings into a stuffing box of the valve bonnet.

As illustrated in FIG. 2, a prior art method of inserting packing rings 24 into valve bonnet 12 requires the packing rings 24 to be removed from their packaging and inserted one at a time into stuffing box bore 18. Thereafter, as illustrated in FIG. 3, gland follower 28 is attached to the top of stuffing box 16 with fasteners 108 and 110. Initially, the fasteners are only hand tightened to maintain gland follower 28 in position. The top end of valve stem 26 is then inserted into the bottom of stuffing box 16 and threaded up through packing rings 24 and yoke bushing 25. Referring now to FIG. 4, the packing rings 24 are compressed by alternately tightening fasteners 108 and 110 either by using standard wrenches and tightening them until they feel satisfactorily compressed or by using a torque wrench and tightening them until reaching a predetermined reading. In accord with the prior art, the final step in assembling the valve bonnet 12 is to attach a hand wheel 112 and locknut 114 to the threaded end of valve stem 26.

To apply more equal compression forces throughout all of the packing rings 24 in stuffing box 16, less than all of the packing rings 24 (for example four rings of a five ring set) are first inserted as described above. Then, gland follower 28 is unfastened and lifted sufficiently clear of stuffing box 16 so that the remaining packing ring(s) can be inserted into stuffing box bore 18 on top of the previously compressed packing rings 24. Thereafter, gland follower 28 is re-fastened to stuffing box 16 and the packing rings 24 are compressed by alternately tightening fasteners 108 and 110 using either of the methods described above.

Figure 5:
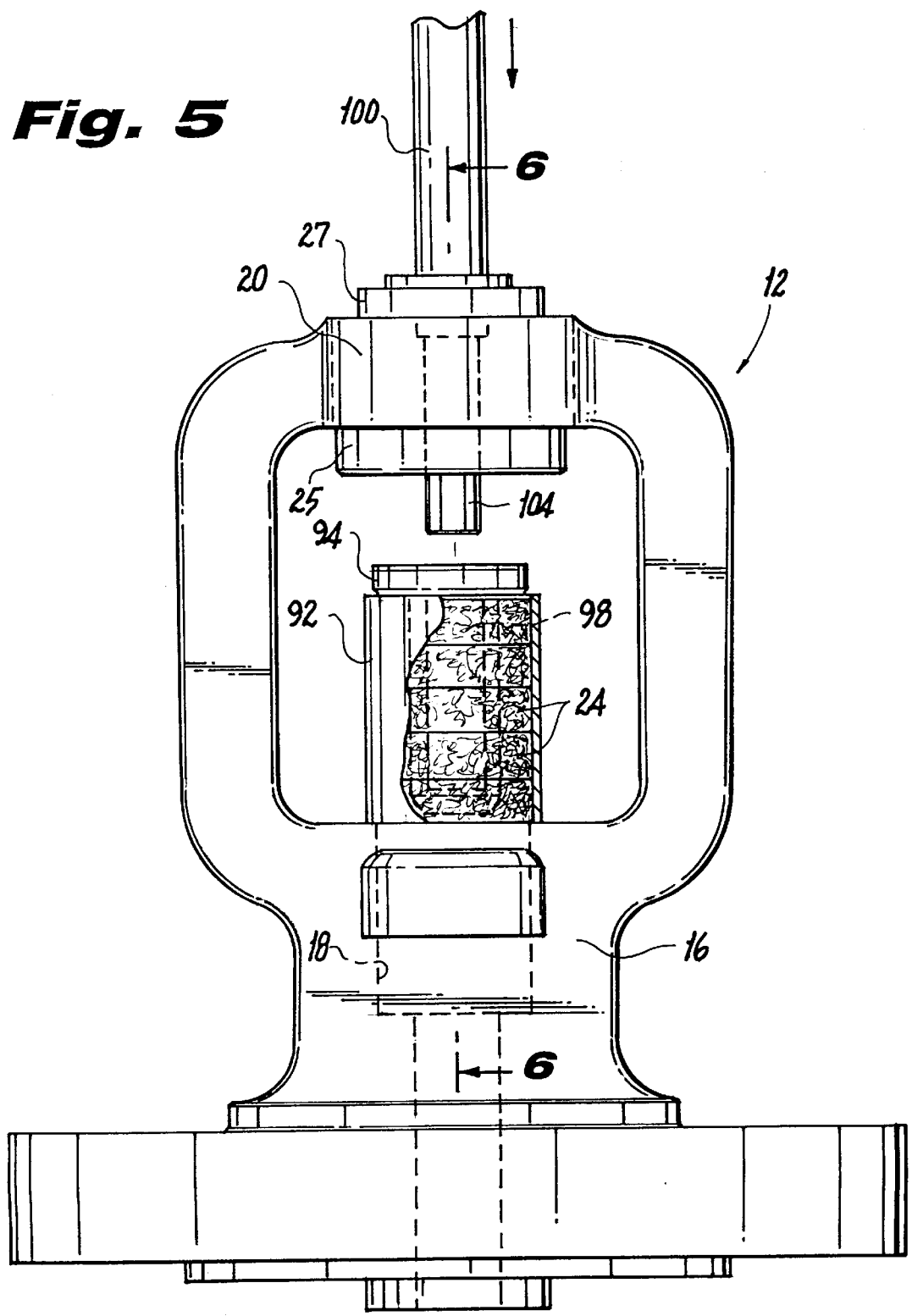
FIG. 5 is an elevational view of a valve bonnet and further illustrates a set of packing ring insertion tools and method of their use in accordance with a preferred embodiment for the present invention in preparation of inserting packing rings into a stuffing box of the valve bonnet.
Figure 6:
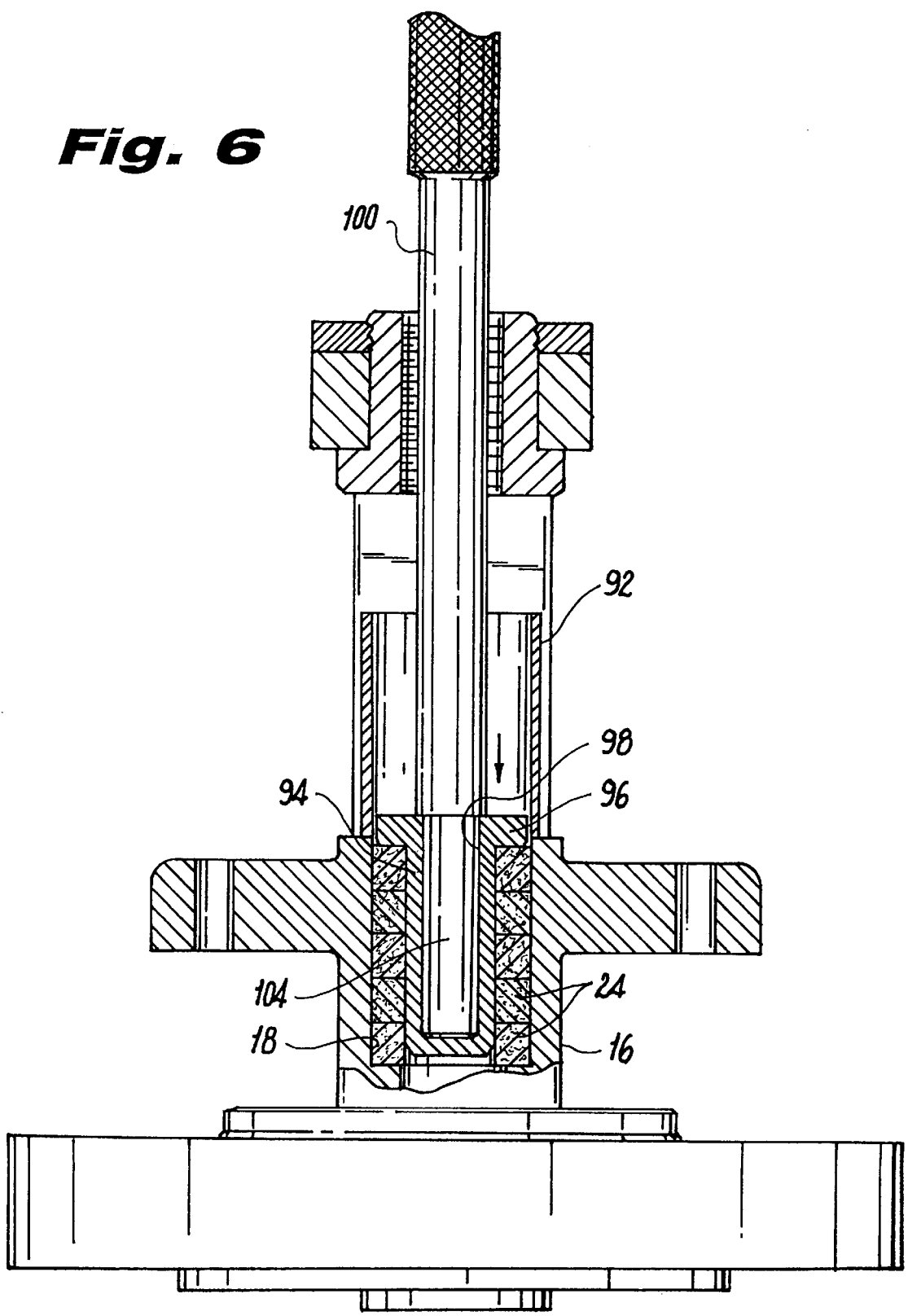
FIG. 6 is an elevational view taken along line 6—6 of FIG. 5 of the valve bonnet in partial cross-section further illustrating insertion of the packing rings with the tools disclosed herein and following a method for their use in accordance with a preferred embodiment of the present invention.
Figure 7:
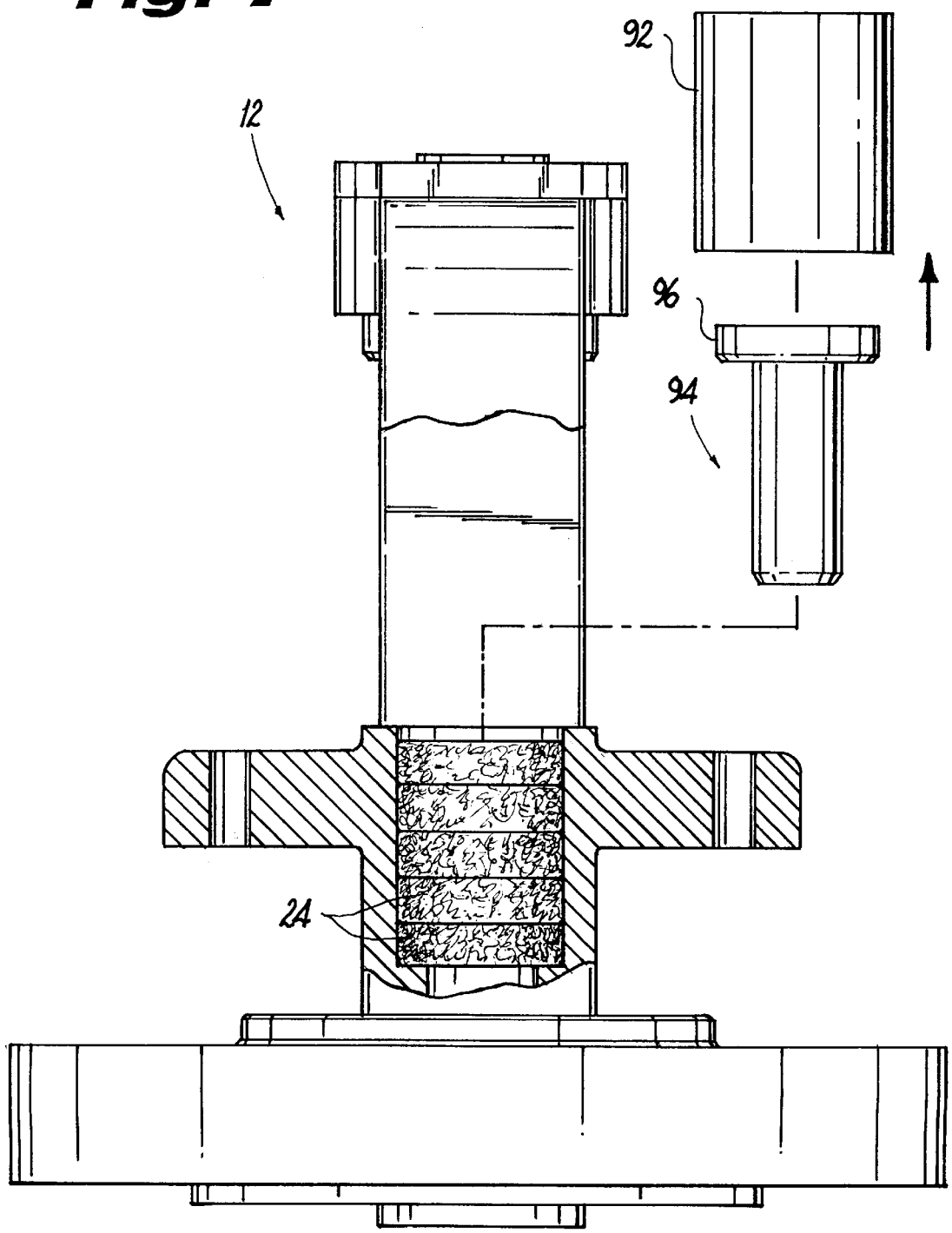
FIG. 7 is an elevational view similar to FIG. 6 of a valve bonnet in partial cross-section illustrating removal of packing ring insertion tools made in accordance with a preferred embodiment of the present invention after insertion of the packing rings.

Referring now to FIG. 5, the present invention operates as follows. Packing rings 24 are inserted into packing sleeve 92 or supplied pre-inserted by a manufacturer as described above. Insert tool 94 is then inserted into one end of the packing rings 24. The packing sleeve/insert tool assembly, 92 and 94, is then positioned above and in axial alignment with stuffing box bore 18 of stuffing box 16. Push rod 100 is inserted through yoke bushing 25 until stepped shoulder 104 fully engages blind bore hole 98 of insert tool 94. As illustrated in FIG. 6, a downward force is applied to push rod 100 to drive packing rings 24 from packing sleeve 92 into stuffing box bore 18 until fully seated. Thereafter, as illustrated in FIG. 7, push rod 100, packing sleeve 92, and insert tool 94 are removed in preparation for insertion of valve stem 26.

With reference to FIGS. 8 and 9, stem chuck 106 is illustrated to drivingly engage the gate engaging end 116 of valve stem 26. To enable engagement with valve stem 26, stem chuck 106 includes an enlarged end portion 118 having an inside diameter wherein hardened shoulders 120 and 122 are brazed allowing prolonged tool life as is well known in the art. The 'flats' created by shoulders 120 and 122 mate with flats provided in gate engaging end 116. Existing valve stems can be modified or redesigned to include a mating configuration. Alternatively, enlarged end portion 118 can be formed to mate with existing gate engaging ends without departing from the spirit and scope of the invention. Stem chuck 106 also includes a stepped shoulder 124 for attachment to a variable speed hand drill 126.

Figure 10:
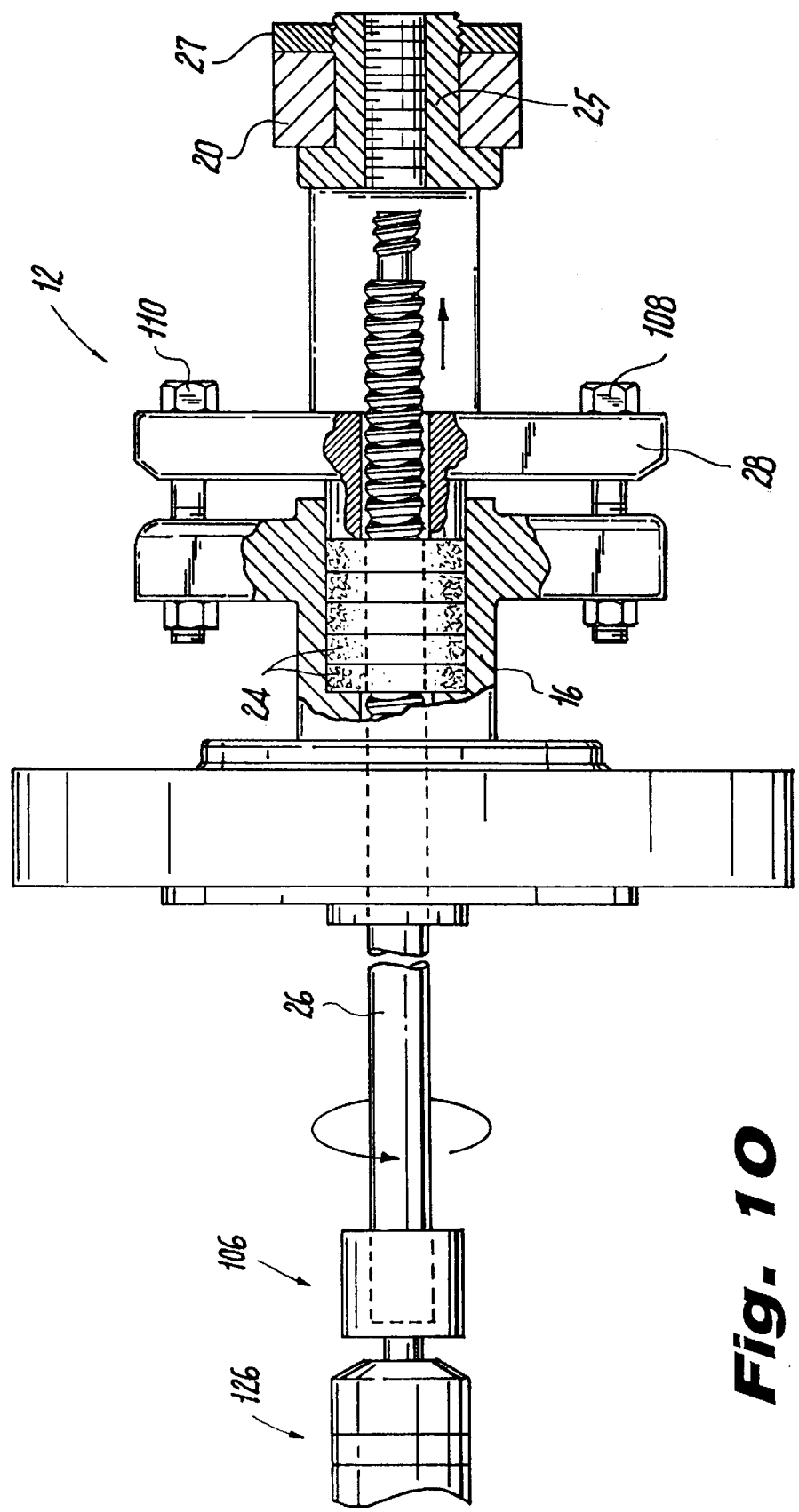
FIG. 10 is an elevational view similar to FIG. 3 of a valve bonnet in partial cross-section, however, illustrating insertion of a valve stem with a stem chuck and power drill and following a method of their use in accordance with a preferred embodiment of the present invention.
Figure 11:
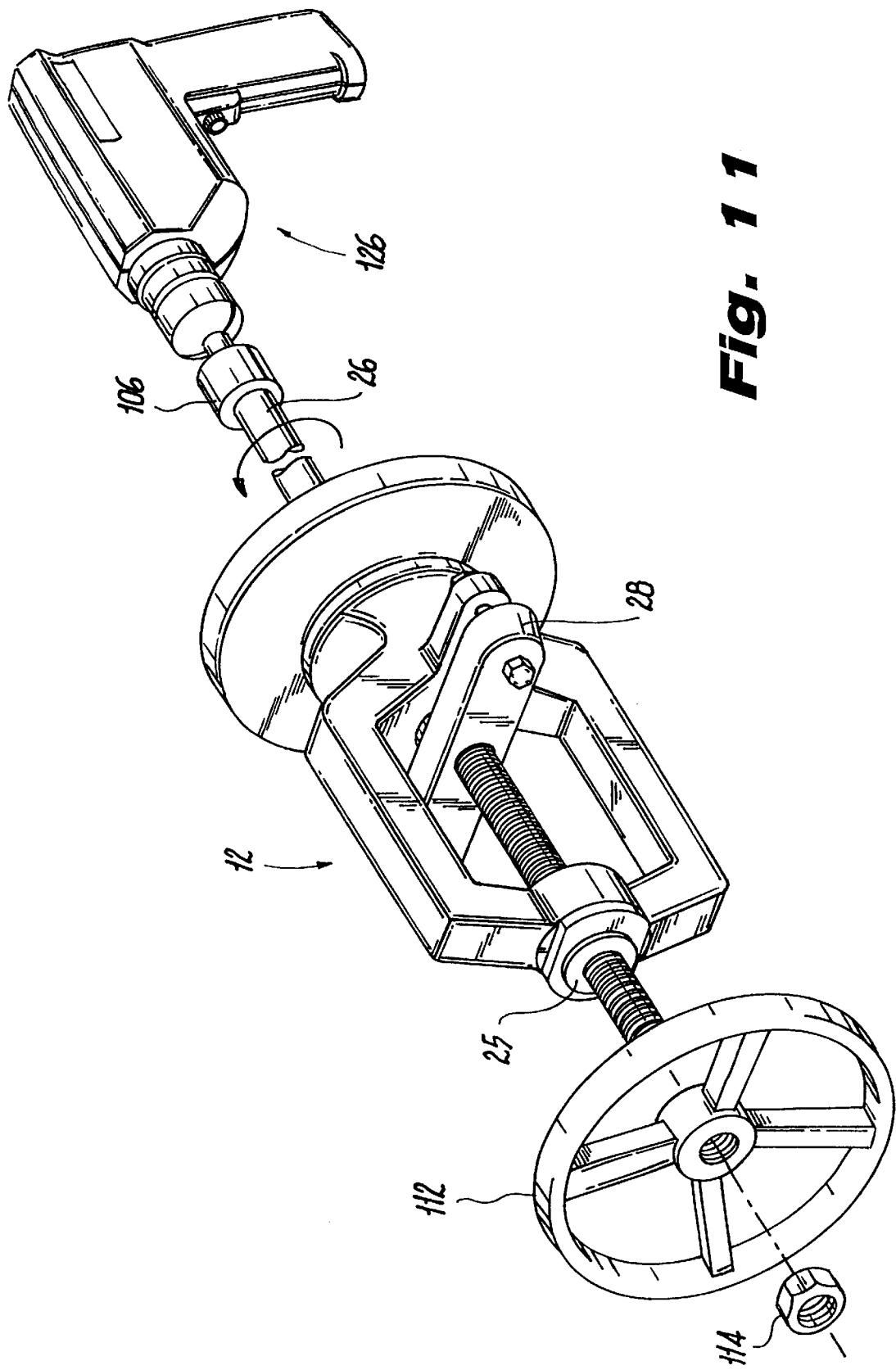
FIG. 11 is a perspective view of a valve bonnet illustrating insertion of a valve stem with the stem chuck and power drill and following a method of their use in accordance with a preferred embodiment of the present invention.

As illustrated in FIGS. 10 and 11, gland follower 28 is assembled to valve bonnet 12 and fasteners 108 and 110 are installed hand tight so not to compress packing rings 24. The threaded end of valve stem 26 is then inserted into the bottom of stuffing box 16 and threaded up through packing rings 24 and yoke bushing 25 utilizing stem chuck 106 and variable speed drill 126. The above assembly is preferably carried out with the valve bonnet 12 installed in the valve packing compression apparatus 10 as it provides for a stable platform upon which to work.

Figure 14:
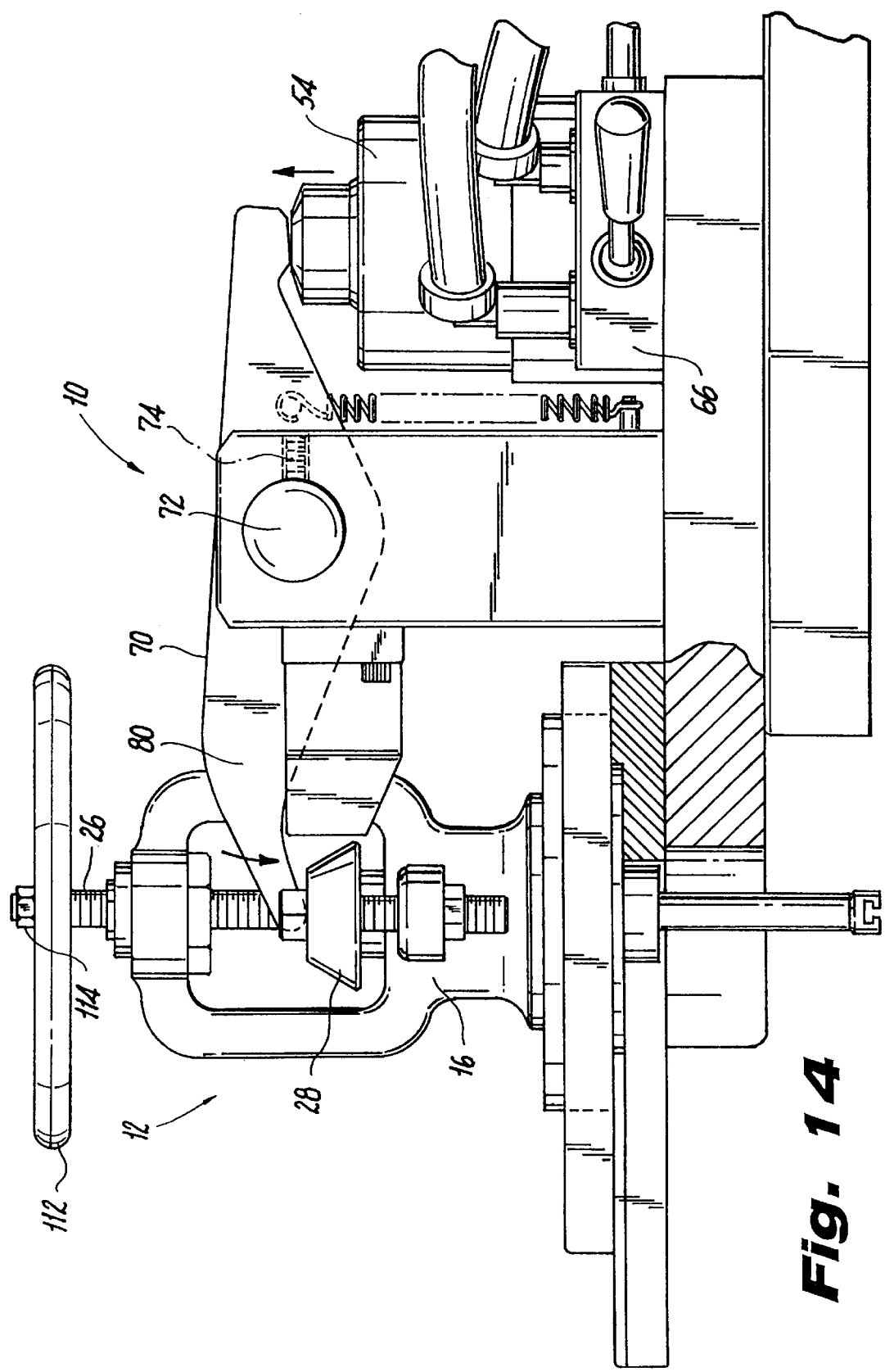
FIG. 14 is an elevational view similar to FIG. 12 of a valve bonnet positioned on a valve packing compression apparatus in partial cross-section illustrating extension of a hydraulic ram and compression of packing rings into a stuffing box of the valve bonnet.

Compressing packing rings 24 within stuffing box 16 is accomplished as follows. Referring to FIGS. 12, 13, and 14, the valve bonnet 12 is positioned within compression apparatus 10 with flange 14 resting on base plate 38 against beveled surfaces 50 and 52 of guide rails 44 and 46, respectively. Tines 78 and 80 straddle yoke support arm 23 and contact the upper surface of gland follower 28. As best illustrated in FIG. 13, each tine contacts gland follower 28 an equal distance from valve stem 26 and along the centerline of gland follower 28, thereby assuring that rocker arm 70 drives gland follower 28 straight down into stuffing box bore 18 (ref. FIG. 1). In addition, as will be described herein below, a nominal amount of force may be applied to gland follower 28 by valve packing compression apparatus 10 to maintain it in position while assembling valve stem 26 to valve bonnet 12.

Referring in particular to FIG. 14, a basic packing ring compression procedure is as follows. With the hydraulic pressure output of hydraulic pump 60 set by the regulator 62 (ref. FIG. 1) at a predetermined value, on/off valve 66 is switched to the 'on' position. It should be noted that the value chosen will correspond to the compression standards for the type of packing rings that are being installed, the valve type, and valve size. Changing the compression loading forces from one standard to another requires only that regulator 62 be adjusted appropriately, as well known to those skilled in the art. Once valve 66 is switched to the 'on' position, piston 58 extends from hydraulic ram 54 urging rocker arm 70 to pivot about dowel pin 72. Tines 78 and 80 drive gland follower 28 vertically down into the stuffing box bore 18 of stuffing box 16 compressing packing rings 24 (ref. FIG. 1) a predetermined amount. When the loading force levels off and remains steady, fasteners 108 and 110 are hand tightened and thereafter on/off valve 66 is switched to the 'off' position, retracting hydraulic ram 54.

In some instances it may be desirable to add an additional packing ring. For example, to more evenly compress a packing ring set or to reduce gland follower 28 penetration into stuffing box bore 18, thereby increasing the number of adjustments a technician can make in the field. In such cases the above procedure is followed, however, fasteners 108 and 110 are not hand tightened. Instead, gland follower 28 is unfastened and raised to clear stuffing box bore 18, an additional packing ring is added to the previously compressed packing rings, gland follower 28 is refastened on top of the additional packing ring, and the compression and fastening procedure described above is repeated.

A cycle and adjust procedure is disclosed herein for installing packing rings 24 into stuffing box 16. The procedure makes it possible to more equally distribute the compressive forces between the packing rings 24 and the valve stem 26 and stuffing box bore 18 than prior art methods allow. Those skilled in the art understand that neither the single step nor the multi-step installation procedures can arrive at a uniform loading force distribution throughout all of the individual packing rings 24 in valve stuffing box 16. It is known that gland follower compression loading methods exert the greatest axial loading forces on those packing rings closest to the top of the stuffing box 16. Consequently, the loading forces experienced by the packing rings positioned lower in the packing set decrease in proportion to each ring's separation distance from the follower. In addition to the above, it is understood that the frictional grip that the upper rings in the stuffing box 16 have on the valve stem 26 surface can be used to disperse additional loading forces through rings positioned in the lower end of the stuffing box 16 by translating the valve stem 26 down through the packing ring assembly. Advantage can be made from these two effects to establish a more uniform distribution of loading forces in a valve's packing rings. The cycle and adjust procedure utilizes the above effects and is described below.

Referring to FIGS. 13 and 14, before starting the cycle and adjust procedure, hand wheel 112 and hand wheel locking nut 114 are attached to valve stem 26. Thereafter, the single or multi-step installation procedure is followed to the point where fasteners 108 and 110 are finally hand tightened. Next, with on/off valve 66 still in the 'on' position and, therefore, tines 78 and 80 still applying compressive loading against gland follower 28, valve stem 26 is rotated by hand wheel 112 so to translate it in the downward direction. As valve stem 26 is rotated, the upper rings that grip the valve stem 26 move downward with valve stem 26, further compressing the lower packing rings. As packing rings 24 further compress, fasteners 108 and 110 tend to loosen. Fasteners 108 and 110 are then retightened by hand. It will be observed that pressure gauge 64 will initially deflect when hand wheel 112 is rotated. Hydraulic pump 60 will pump hydraulic fluid to hydraulic ram 54 to compensate for the reduced pressure until it returns to the predetermined pressure value. The process of rotating valve stem 26 and retightening fasteners 108 and 110 is repeated until the fasteners will not tighten by hand any further. At this point it will be observed that pressure gauge 64 will not deflect any further if hand wheel 112 is rotated. Thereafter, on/off valve 66 is switched to the 'off' position and valve bonnet 12 is ready to be removed from valve packing compression apparatus 10.

Utilizing the cycle and adjust procedure after the single step or multi-step installation procedure establishes nearly uniform compression forces throughout all of the packing rings 24 in the stuffing box 16. An important aspect in following the procedure is to continue rotating the valve stem 26 and retightening fasteners 108 and 110 until there is no discernible change in the pressure reading on pressure gauge 64. Uniform compression forces throughout the packing rings 24 in stuffing box 16 is beneficial in that it maximizes the performance of the packing rings when the valve bonnet is placed into its final service application. Maximum performance is obtained because along with more even ring compression comes more even sealing between each packing ring 24 and the stuffing box bore 18 and the valve stem 26. This is in sharp contrast to the limited seal obtained after carrying out only the single step or multi-step packing ring installation procedure.

Considerable time is saved utilizing packing insertion tools 92, 94, and 100, for inserting packing rings 24 and utilizing valve packing compression apparatus 10 for compressing the packing rings 24 into the stuffing box 16. In addition, by following the above described procedures in using packing insertion tools 92, 94, and 100, the possibility of damaging packing rings 24 is eliminated since packing rings 24 are aligned with and driven straight into stuffing box bore 18 (ref. FIG. 6). Also, by following the above disclosed procedures in using the valve packing compression apparatus 10, the packing rings 24 are more evenly compressed than possible using prior art methods between gland follower 28, stuffing box bore 18, and valve stem 26—leading to substantially increased packing ring life. As noted above, even compression of the packing rings 24 between valve stem 26 and stuffing box bore 18 ensures that all of the packing rings are sealing there between and that the media in the valve (note shown) is unable to infiltrate between the rings to cause the packing ring set 24 to fail prematurely.

While the invention has been described with respect to a preferred embodiment, those skilled in the art will readily appreciate that various other changes or modifications can be made thereto without departing from the spirit of the invention.

What is claimed is:

1. A valve packing compression apparatus for assembling packing rings to a valve bonnet having a gland follower enclosing a stuffing box which depends from a flange and further including a valve stem extending there through, the apparatus comprising:
    a) a base plate configured to support the valve bonnet by its flange;
    b) a datum surface defined by at least one guide fastened to said base plate against which the valve bonnet rests enabling consistent positioning of the valve bonnet in relation to said base plate;
    c) an actuator having a first actuator portion operatively associated with said base plate, and a second actuator portion extendible in relation to said first actuator portion between a first position and a second position;
    d) a compressing member operatively disposed between said second actuator portion and the gland follower and moveable in conjunction with said second actuator portion between said first and second positions; and
    e) an actuation driver cooperating with said actuator to provide power to extend said second actuator portion between said first and second positions.

2. The apparatus of claim 1, further comprising:
    a) a packing sleeve having an inside diameter sufficient to receive packing rings that are dimensioned to fit within the stuffing box of the valve bonnet, said packing sleeve being operatively configured to align with the stuffing box enabling insertion of the packing rings therein;
    b) an insertion tool having an outside diameter approximately equal to that of the packing rings and slideably receivable within said packing sleeve; and
    c) a push rod operatively configured to mate with said insertion tool so to align axially therewith and to drivingly operatively engage the packing rings with the stuffing box.

3. The apparatus of claim 1, further comprising an arm support operatively connected to said base plate and pivotally supporting said compressing member wherein said compressing member is not in contact with the gland follower when said second actuator portion is in said first position and wherein said compressing member is in contact with the gland follower when said second actuator portion is in said second position.

4. The apparatus of claim 3, further comprising a rotation stop bar operatively connected to said arm support and operatively engagable with the gland follower so that rotation thereof is prevented.

5. The apparatus of claim 1, wherein said compressing member further comprises a forked portion, adjacent the gland follower, and having sufficient proportions to straddle a yoke support arm of the valve bonnet.

6. The apparatus of claim 1, wherein said actuator is a hydraulic ram and said actuation driver is a hydraulic pump in fluid communication with said hydraulic ram.

7. The apparatus of claim 6, further comprising a regulator for controlling the fluid pressure supplied by said hydraulic pump to said hydraulic ram.

8. The apparatus of claim 1, further including a double acting switch operating in conjunction with said actuation driver so to activate said actuator to extend and retract said second actuator portion between said first and second positions.

9. A valve packing compression apparatus for assembling packing rings to a valve bonnet having a gland follower for compressing the packing rings between a valve stem and a stuffing box, said apparatus comprising:
   a) a base plate configured to support the valve bonnet and having a clearance groove through which the valve stem passes;
   b) a datum surface extending approximately perpendicular to said base plate and defined by at least one guide rail operationally connected to said base plate, said datum surface enabling consistent positioning of the valve bonnet;
   c) an actuator having a first actuator portion fixed from translational movement in relation to said base plate and a second actuator portion reciprocally extendible in relation to said first actuator portion between a first position and a second position;
   d) a compressing member operatively disposed between said extendible second actuator portion and the gland follower and moveable in conjunction with said second actuator portion between said first and second positions to compress the packing rings; and
   e) an actuation driver cooperating with said actuator to provide power to extend said second actuator portion between said first and second positions.

10. The apparatus of claim 9 further comprising:
   a) a packing sleeve having an inside diameter sufficient to receive packing rings that are dimensioned to fit within the stuffing box of the valve bonnet, said packing sleeve operatively configured to align with the stuffing box for enabling insertion of the packing rings therein;
   b) an insertion tool having an outside diameter approximately equal to the packing rings and slideably receivable within said packing sleeve; and
   c) a push rod configured for operatively connecting with said insertion tool so to align axially therewith and operative to drivingly engage the packing rings with the stuffing box.

11. The apparatus of claim 9, further comprising an arm support operatively connected to said base plate and pivotally supporting said compressing member wherein said compressing member is not in contact with the gland follower when said second actuator portion is in said first position and wherein said compressing member is in contact with the gland follower when said second actuator portion is in said second position.

12. The apparatus of claim 11, further comprising a rotation stop bar operatively connected to said arm support and operationally engagable with said gland follower preventing rotation thereof.

13. The apparatus of claim 9, wherein said compressing member includes a forked portion adjacent the gland follower and having sufficient proportions to straddle a yoke support arm of the valve bonnet.

14. The apparatus of claim 9, wherein said actuator is a hydraulic ram and said actuation driver is a hydraulic pump in fluid communication with said hydraulic ram.

15. The apparatus of claim 14, further comprising a regulator for controlling the fluid pressure supplied by said hydraulic pump to said hydraulic ram.

16. The apparatus of claim 9, further comprising a double acting switch operating in conjunction with said actuation driver so to activate said actuator to extend and retract said second actuator portion between said first and second positions.

17. A valve packing compression apparatus comprising:
   a) a base plate configured to support a valve bonnet and having a clearance groove through which a valve stem of the valve bonnet passes;
   b) a datum surface operatively connected to said base plate and against which the valve bonnet rests enabling consistent operational positioning of the valve bonnet in relation to said base plate;
   c) a hydraulic ram having a first actuator portion operationally connected to said base plate and a second actuator portion reciprocally extendible in relation to said first actuator portion between a first position and a second position;
   d) a compressing member operationally disposed between said extendible second actuator portion and a gland follower of the valve bonnet, and operationally moveable in conjunction with said second actuator portion between said first and second positions for compressing the packing rings;
   e) an arm support operatively connected to said base plate and pivotally operatively supporting said compressing member wherein said compressing member is out of contact with the gland follower when said second actuator portion is in said first position and wherein said compressing member is in contact with the gland follower when said second actuator portion is in said second position;
   f) a rotation stop bar operatively connected to said arm support and operatively engagable with the gland follower for preventing rotation thereof; and
   g) a hydraulic pump in fluid communication with said hydraulic ram for providing fluidic control of said ram to extend said second actuator portion between said first and second positions.

18. The apparatus of claim 17, further comprising:
   a) a packing sleeve having an inside diameter sufficient for receiving packing rings that are dimensioned to fit within a stuffing box of the valve bonnet, said packing sleeve being operatively configured to align with the stuffing box enabling insertion of the packing rings therein;
   b) an insertion tool having an outside diameter approximately equal to the packing rings and operatively slideably receivable within said packing sleeve; and
   c) a push rod operatively connectable with said insertion tool so to align axially therewith and operable to drivingly engage the packing rings with the stuffing box.

19. The apparatus of claim 17, wherein said compressing member includes a forked portion adjacent the gland follower and having sufficient proportions to straddle a yoke support arm of the valve bonnet.

20. The apparatus of claim 17, further comprising a stem chuck operatively configured for axial engagement with a valve stem of the valve bonnet.

21. The apparatus of claim 17, further comprising a regulator for controlling the fluid pressure supplied by said hydraulic pump to said hydraulic ram.

22. The apparatus of claim 17, further comprising a double acting switch operating in conjunction with said hydraulic pump so to activate said hydraulic ram to extend and retract between said first and second positions.

23. The apparatus of claim 17, wherein said datum surfaces are defined by guide rails operatively connected to said base plate.

24. A valve packing compression apparatus for assembling packing rings to a valve bonnet having a gland follower enclosing a stuffing box which depends from a flange and further including a valve stem extending there through, the apparatus comprising:
   a) a base plate configured to support the valve bonnet by the flange;
   b) a datum surface operatively positioned in relation to said base plate and against which the valve bonnet rests enabling consistent positioning of the valve bonnet in relation to said base plate;
   c) a rotation stop bar operatively connected to said base plate and configured to be engagable with the gland follower so that rotation thereof is prevented;
   d) an actuator having a first actuator portion operatively associated with said base plate, and a second actuator portion extendible in relation to said first actuator portion between a first position and a second position;
   e) a compressing member operatively disposed between said second actuator portion and the gland follower and moveable in conjunction with said second actuator portion between said first and second positions; and
   f) an actuation driver cooperating with said actuator to provide power to extend said second actuator portion between said first and second positions.

25. The apparatus of claim 24, further comprising an arm support operatively connected to said base plate and pivotally supporting said compressing member wherein said compressing member is out of contact with the gland follower when said second actuator portion is in said first position and wherein said compressing member is in contact with the gland follower when said second actuator portion is in said second position.

26. The apparatus of claim 24, wherein said compressing member further comprises a forked portion, adjacent the gland follower, and having sufficient proportions to straddle a yoke support arm of the valve bonnet.

27. The apparatus of claim 24, wherein said actuator is a hydraulic ram and said actuation driver is a hydraulic pump in fluid communication with said hydraulic ram.

28. The apparatus of claim 27, further comprising a regulator for controlling the fluid pressure supplied by said hydraulic pump to said hydraulic ram.

29. The apparatus of claim 24, further including a double acting switch operating in conjunction with said actuation driver so to activate said actuator to extend and retract said second actuator portion between said first and second positions.

30. The apparatus of claim 24, wherein said datum surface is defined by at least one guide rail fastened to said base plate.

* * * * *